(12) United States Patent
Otani

(10) Patent No.: US 6,188,651 B1
(45) Date of Patent: *Feb. 13, 2001

(54) INFORMATION RETRIEVAL SYSTEM INCLUDING AUTO-CHANGER FOR AUTO CHANGING INFORMATION-RECORDED MEDIA

(75) Inventor: Kazuo Otani, Kodaira (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/753,171

(22) Filed: Nov. 20, 1996

Related U.S. Application Data

(63) Continuation-in-part of application No. 08/608,036, filed on Feb. 28, 1996, now abandoned, which is a continuation of application No. 08/184,953, filed on Jan. 12, 1994, now abandoned.

(30) Foreign Application Priority Data

Jan. 14, 1993 (JP) ................................................ 5-005025

(51) Int. Cl.⁷ .................................................... G11B 17/22
(52) U.S. Cl. ................................................................ 369/34
(58) Field of Search ................................. 369/34, 36, 191, 369/192; 360/92, 98.04, 98.05, 98.06; 395/154, 400, 425

(56) References Cited

U.S. PATENT DOCUMENTS

| | | | |
|---|---|---|---|
| 4,766,581 | * 8/1988 | Korn et al. | 369/34 |
| 5,025,432 | * 6/1991 | Naito | 369/34 |
| 5,123,000 | * 6/1992 | Fitzgerald et al. | 369/36 |
| 5,128,912 | * 7/1992 | Hug et al. | 369/38 |
| 5,157,646 | * 10/1992 | Amemiya et al. | 369/36 |
| 5,214,768 | * 5/1993 | Martin et al. | 395/425 |
| 5,231,616 | * 7/1993 | Oliver et al. | 369/34 |
| 5,303,214 | * 4/1994 | Kulakowski et al. | 369/34 |
| 5,412,791 | * 5/1995 | Martin et al. | 369/34 |
| 5,465,350 | * 11/1995 | Fueki | 369/34 |
| 5,497,502 | * 3/1996 | Castille | 369/34 |

* cited by examiner

*Primary Examiner*—David L. Ometz
(74) *Attorney, Agent, or Firm*—Fitzpatrick, Cella, Harper and Scinto

(57) ABSTRACT

An information retrieval system has an autochanger for autochanging recording media. The system includes an accommodating section, having a plurality of slots, which accommodates a plurality of optical disks, and a reading section for reading the retrieval information and the image information recorded in an optical disk. A transporting section transports the optical disk between the accommodating section and the reading section. A hard disk is also included which stores the retrieval information recorded in the optical disk and the information indicative of the position of the slot in which the optical disk is accommodated. Prior to accommodating a new optical disk in the accommodating section, a control section reads the retrieval information recorded in the optical disk and allows the hard disk to store the retrieval information and the information indicative of the position of the slot in which the new optical disk will be accommodated. Thus, the control section retrieves the image information recorded in the optical disk on the basis of the retrieval information and the information indicative of the position of the slot, both pieces of information being stored in the hard disk.

21 Claims, 8 Drawing Sheets

| INDEX | SLOT NO. | SIDE | START SECTOR |
|---|---|---|---|
| FIG _ 100 | 0 | A | 70 |
| FIG _ 200 | 0 | A | 900 |
| . | . | . | . |
| PIC _ 300 | 0 | B | 1230 |
| DOC_100 | 0 | B | 500 |
| . | . | . | . |
| FIG _ 500 | 1 | A | 8500 |
| PIC _ 800 | 1 | A | 1200 |
| . | . | . | . |
| DOC_700 | 1 | B | 720 |
| FIG _ 300 | 1 | B | 1500 |
| . | . | . | . |

FIG. 3

| INDEX | START SECTOR |
|---|---|
| FIG _ 100 | 1200 |
| FIG _ 200 | 8200 |
| PIC _ 100 | 2500 |
| PIC _ 300 | 2800 |
| | |

FIG. 4

| INDEX | START SECTOR |
|---|---|
| FIG _ 400 | 1000 |
| DOC_100 | 1200 |
| PIC _ 200 | 2000 |
| DOC_200 | 3200 |
| FIG _ 300 | 3800 |

FIG. 5

| INDEX | SLOT NO. | START SECTOR |
|---|---|---|
| FIG _ 100 | 0 | 1200 |
| FIG _ 200 | 0 | 8200 |
| PIC _ 100 | 0 | 2500 |
| PIC _ 300 | 0 | 2800 |
| FIG _ 400 | 1 | 1000 |
| DOC_100 | 1 | 1200 |
| PIC _ 200 | 1 | 2000 |
| DOC_200 | 1 | 3200 |
| FIG _ 300 | 1 | 3800 |
| ⋮ | ⋮ | ⋮ |

| INPUT INDEX |
|---|
| FIG — * |

FIG. 9

| INDEX | SLOT NO. | SIDE | START SECTOR |
|---|---|---|---|
| FIG _ 100 | 0 | A | 70 |
| FIG _ 200 | 0 | A | 900 |
| ⋮ | ⋮ | ⋮ | ⋮ |
| PIC _ 300 | 0 | B | 1230 |
| DOC _ 100 | 0 | B | 500 |
| ⋮ | ⋮ | ⋮ | ⋮ |
| FIG _ 500 | 1 | A | 8500 |
| PIC _ 800 | 1 | A | 1200 |
| ⋮ | ⋮ | ⋮ | ⋮ |
| DOC _ 700 | 1 | B | 720 |
| FIG _ 300 | 1 | B | 1500 |
| ⋮ | ⋮ | ⋮ | ⋮ |

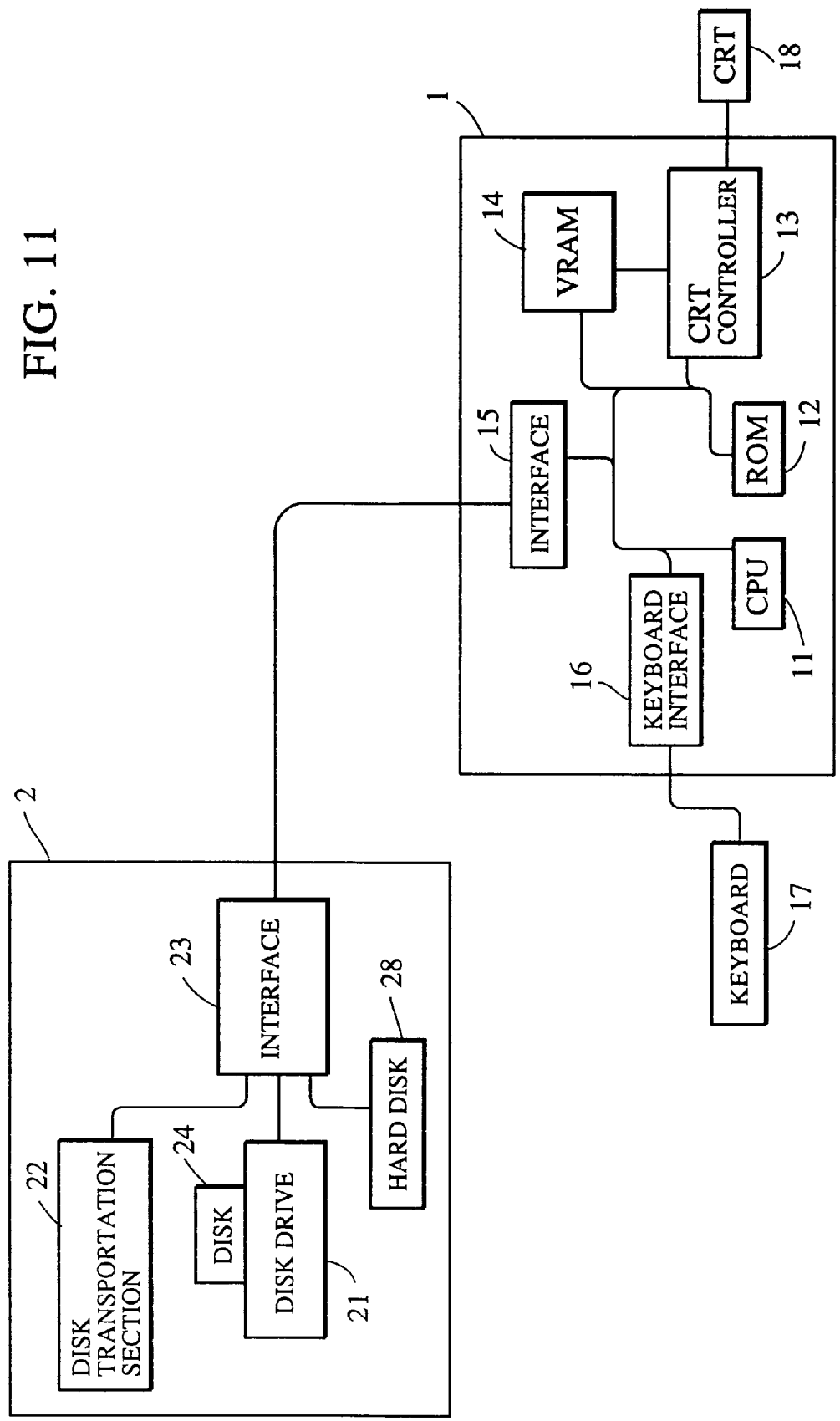

Ser. No. 08/608,036, filed Feb. 28. 1996, now abandoned, which was a continuation of application Ser. No. 08/184, 953, filed Jan. 12, 1994, now abandoned.

INFORMATION RETRIEVAL SYSTEM INCLUDING AUTO-CHANGER FOR AUTO CHANGING INFORMATION-RECORDED MEDIA

This application is a continuation-in-part of application Ser. No. 08/608,036, filed Feb. 28. 1996, now abandoned, which was a continuation of application Ser. No. 08/184, 953, filed Jan. 12, 1994, now abandoned.

BACKGROUND OF THE INVENTION

1. Field of the Invention

The present invention relates to an information retrieval system including an autochanger for autochanging information-recorded media such as optical disks, laser disks, compact disks, microfilms, etc.

2. Description of the Related Art

A conventional image retrieval system for storing image data in an optical disk in order to store an image and retrieve the stored image data, is constructed such that both the image data and the retrieval data for retrieving the image data are stored in a removable optical disk, the image data being retrieved in accordance with the retrieval data.

It is considered that a plurality of optical disks can be autochanged using an auto diskchanger.

However, when the image data is retrieved from a plurality of optical disks, a user must instruct the autochanger to select a suitable optical disk which is transported to a disk drive within the electric file. Subsequently, he/she must retrieve the targeted image from the optical disk in accordance with the retrieval data stored in the optical disk. If the targeted image does not reside in the optical disk selected by the user, the user must enter another instruction to select another optical disk and continue to attempt to retrieve the targeted image as described above until the targeted image is found. Thus, the more optical disks stored in the auto diskchanger, the more time-consuming and troublesome the operation of the apparatus becomes.

SUMMARY OF THE INVENTION

Accordingly, an object of the present invention is to provide an information retrieval system which can solve the above problems.

Another object of the present invention is to provide an information retrieval system which is capable of speedily retrieving information recorded in a plurality of information-recorded media.

A further object of the present invention is to provide an information retrieval system which is capable of freely inserting and removing a plurality of information-recorded media.

Further objects, features and advantages of the present invention will become apparent from the following description of the preferred embodiments with reference to the attached drawings.

BRIEF DESCRIPTION OF THE DRAWINGS

FIG. 3 shows the retrieval information stored in an optical disk 24;

FIG. 4 shows the retrieval information stored in another optical disk 24;

FIG. 5 shows the retrieval information stored in a hard disk 20;

FIG. 6 shows the screen displayed on a CRT 18 into which the retrieval information is input;

FIG. 9 shows the retrieval information stored in the hard disk 20;

FIG. 11 is a block diagram of a second embodiment.

DETAILED DESCRIPTION OF THE PREFERRED EMBODIMENTS

Figure 1:
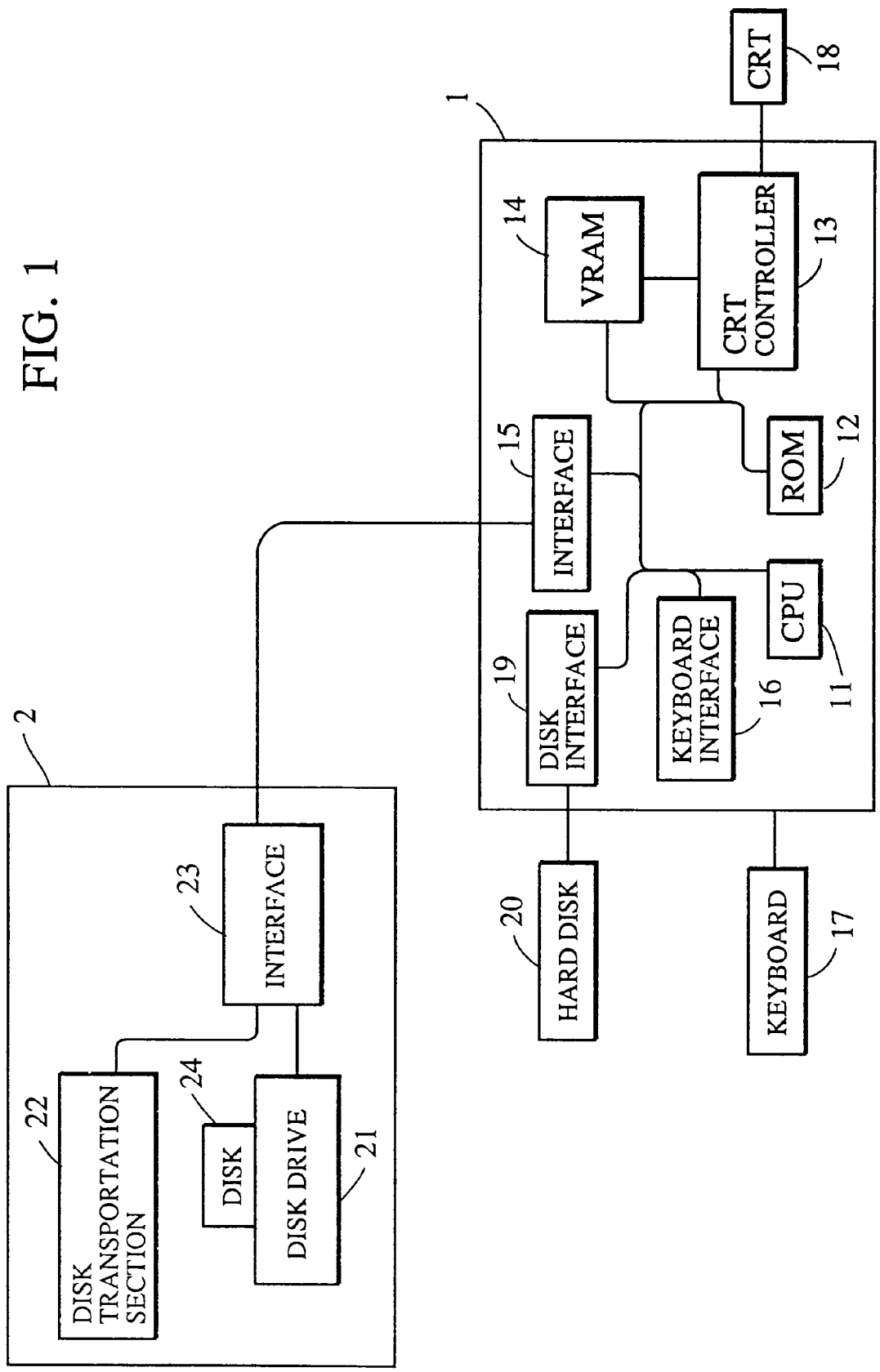
FIG. 1 is a block diagram showing a first embodiment of the present invention.

FIG. 1 is a block diagram showing an image information retrieval system of an embodiment according to the present invention.

A control unit 1 controlling the image information retrieval system uses a general-purpose computer.

Figure 2:
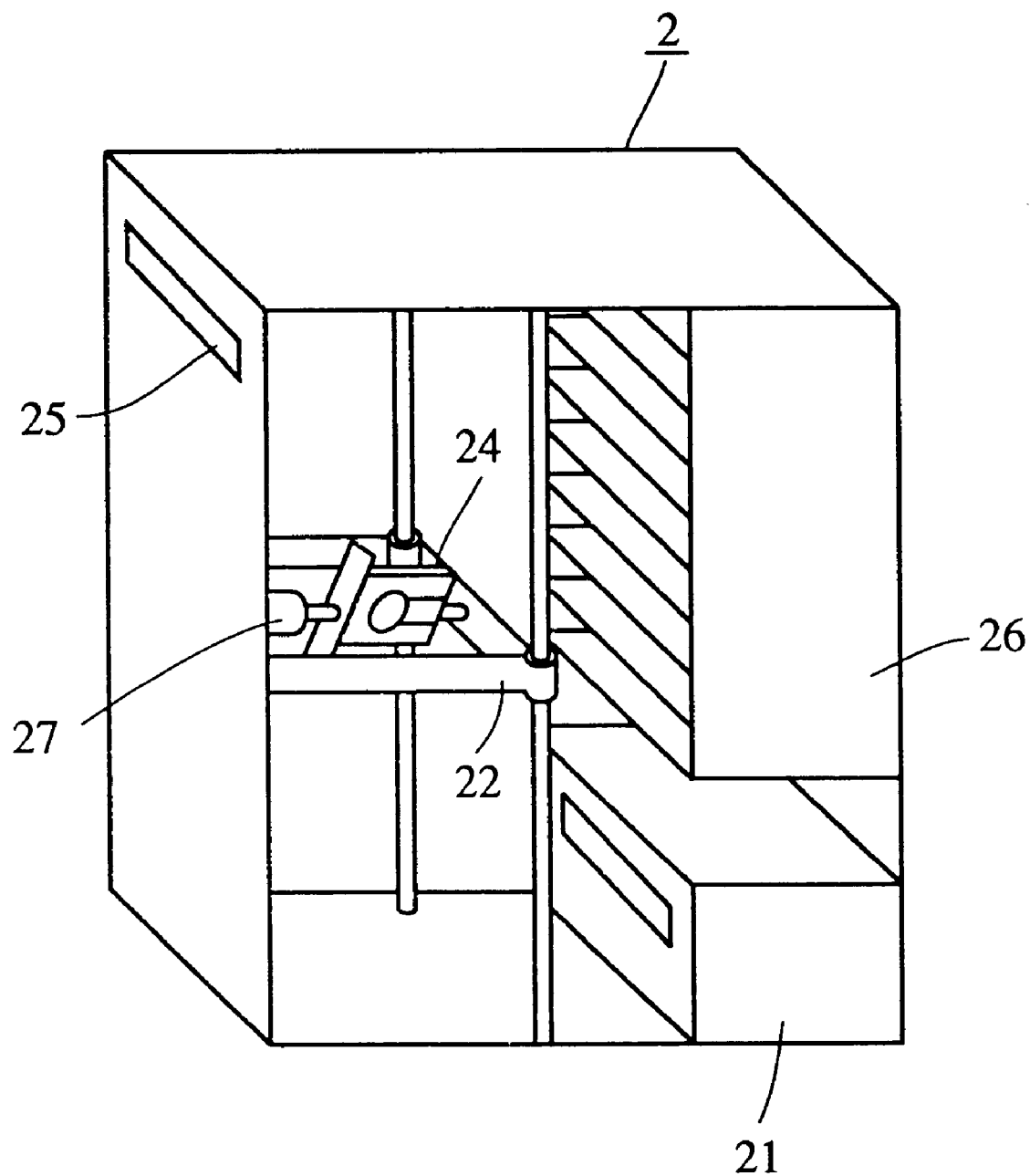
FIG. 2 is an outer view of an autochange disk unit 2.

An autochange disk unit 2 stores a plurality of recording media, e.g., optical disks, and selects an arbitrary optical disk so as to read the information stored in the selected optical disk. FIG. 2 is a perspective view showing the inside of the autochange disk unit 2.

The autochange disk unit 2 includes a disk drive 21 for reading and writing the information by driving an optical disk 24; disk slots 26 for storing a plurality of optical disks 24; an opening 25 for inserting and removing the optical disk into/from the autochange disk unit 2; and a disk transportation section 22 for transporting the optical disk between the disk slots 26 and the disk drive 21. The autochange disk unit 2 also includes an interface section 23 for externally controlling the disk transportation section 22 and the disk drive 21. The optical disk 24 stores image information; index data for retrieving the desired image information, as illustrated in FIG. 3; and the information corresponding to the position on the disk in which the image information is stored. FIG. 4 shows the retrieved information stored in another disk within the autochange disk unit 2.

A user enters an instruction to insert a disk via a keyboard 17 before he/she inserts the disk 24 into the autochange disk unit 2. Upon receiving the instruction from the user, the CPU 11 instructs the disk transportation section 22 to transport the optical disk 24 being inserted into the opening 25 to the disk drive 21. At the same time, the CPU 11 recognizes which slot is currently vacant by means of disk detecting sensors (not shown) arranged in the respective disk slots 26 so as to determine in which disk slot the optical disk 24 will be stored.

Immediately upon being transported to the disk drive 21, the image retrieval information stored in the optical disk 24 is read by the CPU 11, which transfers it to a hard disk 20 via a disk interface 19. Concurrently, the disk slot numbers determined by the CPU 11 previously are written into the hard disk 20 in correspondence with the respective documents. Subsequently, the disk 24 is transported to the determined disk slot.

Every time the user inserts the disk 24 into the autochange disk unit 2, the CPU 11 transfers the image retrieval information from the disk 24 to the hard disk 20. Thus, when a plurality of disks 24 are stored in the autochange disk unit 2, the image retrieval information within the hard disk 20 relates to a plurality of disks. As shown in FIG. 5, the hard disk 20 stores the index, the position of the disk slot in which the image-recorded disk is stored, and the information corresponding to the position on the disk in which the image information is stored.

The operations described above can be realized by the control of the CPU 11 according to the control code within the ROM 12.

When the user wishes to retrieve an image, he/she operates the keyboard 17 connected to the control unit.

Figure 7:
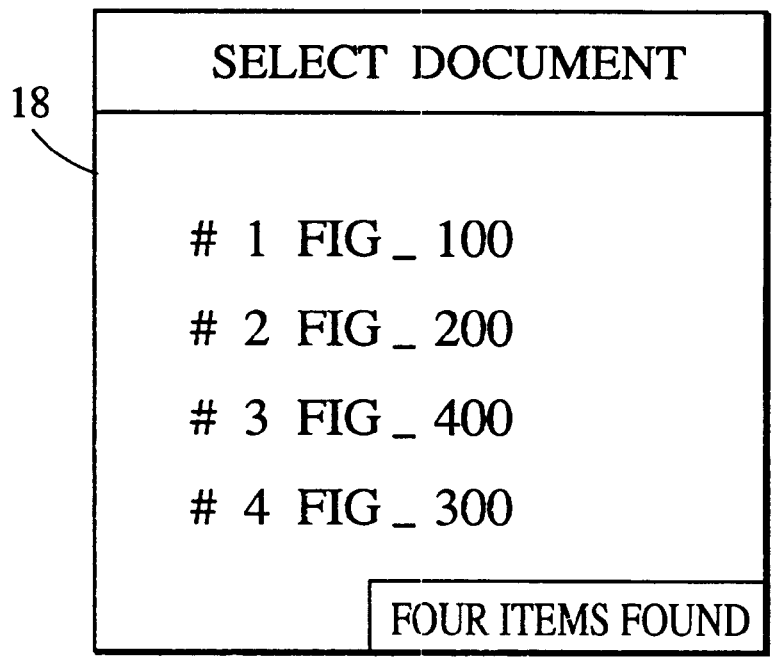
FIG. 7 shows the screen as a result of the retrieval displayed on the CRT 18.

The user inputs the index information on the index input screen displayed on a CRT 18 in order to retrieve the image as illustrated in FIG. 6. "*" means an arbitrary character string. In FIG. 6, the retrieval of the index information starting with "FIG__" is instructed. The CPU 11 retrieves the targeted image by comparing the retrieval conditions set for the index with the image retrieval information recorded in the plurality of disks shown in FIG. 5 and stored in the hard disk 20. Upon a search of the input index information in all the disks stored in the autochange unit 2, the results are displayed on the CRT 18, as illustrated in FIG. 7. The user sees the display shown in FIG. 7 and selects a specific document by the keyboard 17. For example, when "FIG__ 400" is selected, the CPU 11 refers to the information stored in the hard disk 20 and determines the image starting with the 1000th sector of the disk slot 1 so as to instruct the disk transportation section 22 to transport the optical disk 24 stored in the disk slot 1 to the disk drive 21.

Afterwards, the image information starting with the 1000th sector is read by the disk drive 21. The read image information is transferred to a VRAM 14, which is an image display memory, via the interface 15 and displayed on the CRT 18 by the control of the CRT controller 13.

When the specific disk is removed from the autochange disk unit 2, the user instructs the CPU 11, by way of the keyboard 17, which disk should be removed. For example, when the CPU 11 is instructed to remove the optical disk 24 stored in the disk slot 0, it erases the image retrieval information within the hard disk 20, more specifically, the pieces of the image retrieval information indicated by the bracket 30 in FIG. 5, and at the same time, instructs the disk transportation section to transport the optical disk 24 stored in the disk slot 0 to the opening 25. As a result, the hard disk 20 stores only the retrieval information in the disk being currently stored within the autochange disk unit 2.

The above control enables the user to display the desired image merely by inputting the index information without necessarily being aware that there are a plurality of disks in the autochange disk unit 2.

The retrieval information may be stored in a memory (not shown) included in the control unit. In this case, the memory is preferably non-volatile, such as a RAM retained by a battery.

A description will now be given of the information retrieval system using the two-sided optical disk 24 having sides A and B.

Figure 8:
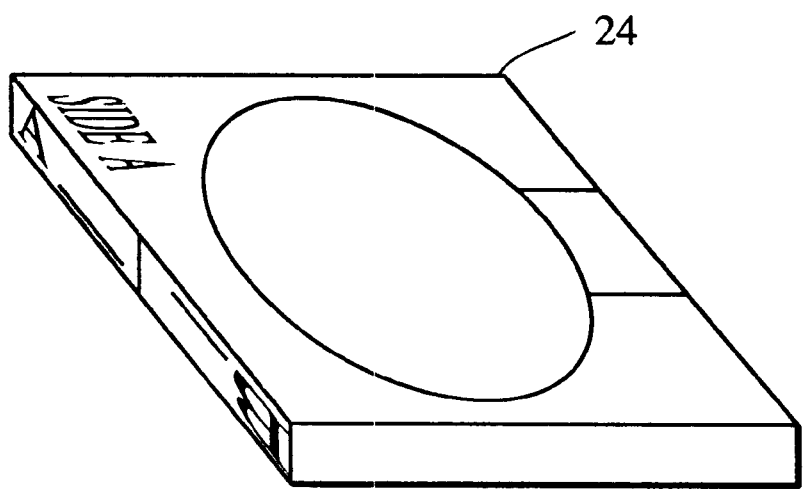
FIG. 8 is an outer view of the disk 24.

FIG. 8 is an outer view of the two-sided optical disk 24. The optical disk 24 thus has sides A and B.

Both the image information and the retrieval information for retrieving the image information are stored in the respective sides A and B of the optical disk 24.

The information indicating on which side, A or B, the above information is stored (hereinafter referred to as the side information) is written in a predetermined region of the optical disk 24. The disk drive 21 is constructed as follows. When the disk with side A on top is loaded in the disk drive 21, the information stored on side A can be obtained.

Likewise, when the disk with side B on top is loaded in the disk drive 21, the information stored on side B can be obtained. A side-turning motor 27 is arranged in the autochange disk unit 2, and consequently, either side of the optical disk 24 can be loaded in the disk drive 21. The information stored in the loaded side can be stored in the hard disk 20 when the optical disk 24 is loaded.

When the optical disk 24 having two sides A and B is loaded in the disk drive 21, the image retrieval information stored on the side on top of the optical disk 24 is read as stated above. Concurrently, the side information stored in a predetermined region of each document is written to the hard disk 20. Afterwards, the disk 24 is removed from the disk drive 21 by the disk transportation section 22, and the side turning motor 27 is driven so as to turn the opposite side of the disk 24 on top. The disk 24 is set in the disk drive again. The image retrieval information and the side information are read and written into the hard disk 20, after which the disk is transported to a predetermined disk slot 26.

When a plurality of disks 24 are stored in the autochange disk unit 2, the image retrieval information stored in the hard disk 20 relates to both sides of each of the disks. More specifically, such information includes the index, the position of the disk slot storing the disk in which the image is recorded, the side information, and the information indicative of the position on the disk in which the image information is stored.

As constructed above, the CPU 11 reads the image retrieval information illustrated in FIG. 9, thereby enabling the retrieval relating to both sides of the plurality of disks according to the index.

When the disk 24 is removed from the autochange disk unit 2, the CPU 11 erases the retrieval information stored on both sides of the disk, from the hard disk 20.

In the present embodiment, the image retrieval information relating to both sides of the disk is written into the hard disk 20 on the basis of the side information written in a predetermined region of the optical disk 24. However, if the side information is not written in the optical disk 24, the image retrieval information relating to both sides of each of a plurality of disks may be retrieved according to which side of each disk is on top when the disk is initially inserted into the autochange disk unit 2 as shown in FIG. 9.

Also, in the present embodiment, in which the disk 24 stores the side information, when the disk 24 is stored in the disk slot, it is essential that side A of the disk be turned on top or that hard disk 20 store information indicating whether side A/B is on top as stored in the disk slot.

On the other hand, when the disk 24 does not store the side information, it is essential that the disk be stored in the disk slot in the same state as when the disk was initially inserted into the autochange disk unit 2, or that the hard disk 20 store information indicating whether the disk is stored in the disk slot in the same state or in the opposite state to when it was initially inserted into the autochange disk unit 2.

The operations described above can be realized by the control of the CPU 11 according to the control code within the ROM 12.

Figure 10:
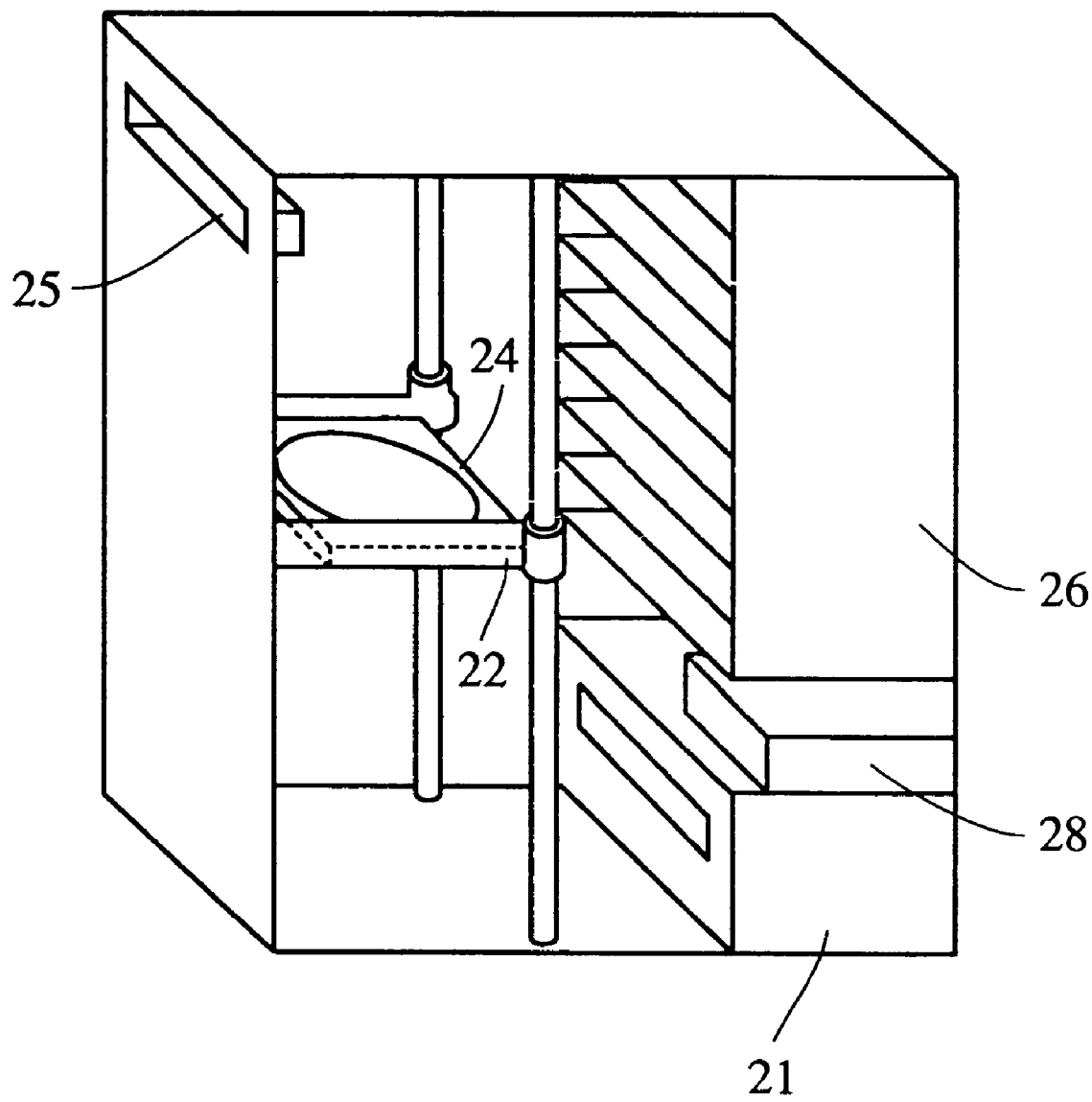
FIG. 10 is an outer view of the autochange disk unit 2 according to a second embodiment.

The image information retrieval system of a second embodiment is shown in FIGS. 10 and 11.

In this embodiment, a hard disk 28 is arranged within the autochange disk unit 2.

Since the hard disk 28 is built into the autochange disk unit 2 according to the present embodiment, all the image information and the retrieval information can be controlled within the autochange disk unit 2.

Therefore, the present embodiment offers the following advantages. The exchange of the autochange disk units 2 simply enables the retrieval of another image retrieval information. Also, the information retrieval system constructed above easily controls access to confidential documents. Moreover, a confidentiality function, such as a known password method, may be added to the overall autochange disk unit 2, and as a result, not only the image itself but also the retrieval information can be made confidential.

As stated above, when a first information-recorded means is loaded, the retrieval information stored in the first information-recorded means is transferred to a second information-recorded means, and the image information stored in the first information-recorded means is retrieved on the basis of the retrieval information stored in the second information-recorded means. Hence, when the first information-recorded means are plural and the image information is retrieved from these means, the retrieval can be performed easily and speedily.

The present invention is applicable to a system for retrieving sound information, for example, a jukebox or a karaoke system having an autochanger for autochanging laser disks (LD) or compact disks (CD).

The present invention is also applicable to an autochanger for autochanging microfilms.

Further, although the CPU 11 controls the information retrieval system of the present invention in accordance with the control code stored in the ROM 12 in the present embodiments, a program stored in a floppy disk or the like may be loaded in the RAM of the control unit, and thus, the CPU 11 may control the present invention in accordance with the program stored in RAM.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information retrieval system for retrieving targeted information from among a plurality of information recorded on two sides of each of several recording media on the basis of index information, which corresponds to the targeted information and which is also recorded within the recording media, said system comprising:

accommodating means for accommodating a plurality of said recording media, and wherein the recording media are added or removed by one unit to or from said accommodating means, without other recording media in said accommodating means being removed;

reading means for reading the index information and the targeted information which is recorded within each of said recording media and for reading associated side information identifying the side of the recording medium on which the targeted information is recorded;

generating means for automatically generating position information indicating an accommodating section in which a newly inserted recording medium is accommodated in said accommodating means;

storing means for storing the index and associated side information read by said reading means together with corresponding position information of said newly inserted recording medium generated by said generating means;

input means for inputting desired index information; and retrieval means for comparing the index information input by said input means with the index information which is stored together with corresponding position information by said storing means, and on the basis of a result of this comparison, selecting the recording medium based upon said corresponding position information from among the plurality of recording media, selecting the side of the recording medium corresponding to the stored associated side information and retrieving the targeted information from the selected recording medium.

2. An information retrieval system according to claim 1, further comprising a control means, and wherein when the recording medium accommodated in said accommodating means is removed from said information retrieval system said control means erases the index information relating to that recording medium stored in said storing means.

3. An information retrieval system according to claim 1, wherein the targeted information to be retrieved is image information.

4. An information retrieval system according to claim 1, wherein the targeted information to be retrieved is sound information.

5. An information retrieval system according to claim 1, further comprising transporting means for transporting the recording medium between said accommodating means and said reading means.

6. A recording medium handling apparatus comprising:

accommodating means having a plurality of accommodating sections for accommodating a plurality of recording media each of which has two sides which contain information to be targeted and index information which identifies the information to be targeted, wherein such recording media are added or removed by one unit to or from said accommodating means, without other recording media in said accommodating means being removed;

reading means for reading index information recorded in a recording medium which is newly inserted in said accommodating means and for reading side information which identifies the side of the recording medium on which the targeted information is recorded;

generating means for automatically generating position information indicating an accommodating section in which the newly inserted recording medium is accommodated in said accommodating means;

storing means for storing the index and side information read by said reading means and corresponding position information generated by said generating means;

input means for inputting desired index information; and selecting means for comparing the index information input by said input means and the index information and side information stored by said storing means, and on the basis of a result of this comparison, obtaining the corresponding position information stored in said storing means, thereby to select the recording medium which contains the targeted information.

7. An information retrieval system according to claim 6, further comprising a control means, and wherein, when the recording medium accommodated in said accommodating means is removed from said information retrieval system, said control means erases the index information and the position information, both the index information and the position information relating to the recording medium being stored in said storing means.

8. An information retrieval system according to claim 6, wherein the targeted information to be retrieved is image information.

9. An information retrieval system according to claim 6, wherein the targeted information to be retrieved is sound information.

10. An information retrieval system according to claim 6, further comprising transporting means for transporting the reading medium between said accommodating means and said reading means.

11. An autochanger associated with an information retrieval apparatus for retrieving targeted information from among a plurality of information recorded on two sides of one of several recording media on the basis of index information, which corresponds to the targeted information and which is also recorded within the recording media, said autochanger comprising:

accommodating means having a plurality of said accommodating sections for accommodating a plurality of recording media, wherein the recording media are added or removed by one unit to or from said accommodating means, without other recording media in said accommodating means being removed;

reading means for reading the index information recorded in a recording medium to be added to said accommodating means, before the information retrieval apparatus starts retrieval and for recording side information identifying the side of each recording medium on which the targeted information is recorded;

generating means for automatically generating position information indicating an accommodating section in which the recording medium to be added is accommodated in said accommodating means; and transmitting means for transmitting the index and side information read by said reading means from the added recording medium together with the position information generated by said generating means to the information retrieval apparatus.

12. An autochanger according to claim 11, wherein said reading means reads the index information recorded in the recording medium and said transmitting means transmits the index information, whenever a recording medium is placed in said autochanger.

13. An autochanger according to claim 11, further comprising a recording medium entrance, and transporting means for transporting a recording medium between said entrance and said accommodating means and said reading means, wherein after said transportation means transports the recording medium from said entrance to said reading means, said reading means reads the index information recorded in the recording medium, and said transporting means transports the recording medium to said accommodating means after reading of the index information.

14. An information retrieval method comprising the steps of:

providing an accommodating means having a plurality of accommodating sections for accommodating a plurality of recording media, wherein the recording media are added or removed by one unit to or from the accommodating means, without other recording media in said accommodating means being removed;

reading index information corresponding to targeted information recorded in one of two sides of the recording media and reading side information corresponding to the side of the recording media on which the targeted information is recorded;

generating position information indicating an accommodating section in which a newly inserted recording medium is accommodated in said accommodating means;

storing the index information and the side information read by said reading means and position information generated by said generating means such that the read index information and side information for a particular recording medium is associated with the generated position information for the same recording medium;

inputting desired index information;

comparing the input desired index information and the stored index information;

selecting that recording medium, from among the plurality of recording media, which contains desired index and associated targeted information, on the basis of a result of this comparison, said selection being carried out by ascertaining the position information and side information associated with the read index information; and retrieving the targeted information from the selected recording medium.

15. An information retrieval method according to claim 14, further comprising the steps of erasing the index information corresponding to a given recording medium responsive to that recording medium being removed from an information retrieval system in which said method is being used.

16. An information retrieval system for retrieving targeted information from among a plurality of information recorded on two sides of each of several recording media on the basis of index information, which corresponds to the targeted information and which is also recorded within the recording media, said system comprising:

accommodating means for accommodating a plurality of recording media;

reading means for reading the index information and the targeted information which is recorded within each of said recording media and for reading side information identifying the side of the recording media on which the targeted information is recorded;

generating means for automatically generating position information indicating an accommodating section in which a newly inserted recording medium is accommodated in said accommodating means;

storing means for storing index and side information of said newly inserted recording medium read by said reading means and corresponding position information of said newly inserted recording medium generated by said generating means;

input means for inputting desired index information;

retrieval means for comparing the index information input by said input means and index information which is stored by said storing means, and on the basis of a result of this comparison, selecting corresponding position and side information of the recording medium from among the plurality of recording media in which the targeted information is recorded, and retrieving the targeted information from the selected recording medium and selected side thereof; and transporting means including means for taking out at least one selected recording medium from the accommodating means on the basis of the retrieved targeted information.

17. A recording medium handling apparatus comprising:

accommodating means which includes a plurality of accommodating sections for accommodating a plurality of recording media;

reading means for reading index information and associated targeted information which is recorded in two sides of each of said recording media as well as side information corresponding to a side of said media on which said associated target information is recorded;

generating means for automatically generating position information indicating an accommodating section in which a newly inserted recording medium is accommodated in said accommodating means;

storing means for storing index information and side information read by said reading means and corresponding position information of said newly inserted recording medium generated by said generating means;

input means for inputting desired index information; and selecting means for comparing the index information input by said input means with index information stored in said storing means, and on the basis of a result of this comparison, obtaining the corresponding position information and side information stored in the storing means, thereby to select the recording medium and the side thereof which contains the targeted information.

18. An autochanger associated with an information retrieval apparatus for retrieving targeted information from among a plurality of information recorded on two sides of each of several recording media on the basis of index information, which corresponds to the targeted information and to the side of said media on which the targeted information is recorded, said targeted information also being recorded within the recording media, said autochanger comprising:

accommodating means having a plurality of accommodating sections for accommodating a plurality of said recording media;

reading means for reading the index information recorded in a recording medium to be added to said accommodating means together with position information of the accommodating section of said accommodating means in which said recording medium is to be added, and together with said side information, before the information retrieval apparatus starts retrieval; and transmitting means for transmitting to the information retrieval apparatus, index information read by said reading means from the added recording medium, together with side information indicative of the side of said added recording medium corresponding to said index information and position information indicative of the accommodating section in which said added recording medium is accommodated.

19. An information retrieval method comprising the steps of:

reading index information corresponding to information to be targeted, which is recorded in a plurality of recording media, said index information including information corresponding to a side of said recording media on which said information to be targeted is record;

generating position information indicating an accommodating section in which a newly inserted recording medium is accommodated in an accommodating means;

storing the read index information recorded in the plurality of recording media together with said information correspondent to a side of said recording media on which information not be targeted is recorded, and together with associated position information such that the read index information for a particular recording medium is associated with the generated position information for the same recording medium;

inputting desired index information;

comparing the input desired index information and the stored index information;

selecting, based upon the position information associated with the compared stored index information, that recording medium, from among the plurality of recording media, and the side thereof which contains targeted information;

retrieving the targeted information from said side of the selected recording medium; and removing at least one selected recording medium from said accommodating means accommodating the recording media, on the basis of the retrieved targeted information.

20. A method of handling a recording medium comprising the steps of:

accommodating a plurality of recording media in an accommodating means having a plurality of accommodating sections, wherein the recording media are added or removed by one unit at a time to or from said accommodating means, without other recording media in said accommodating means being removed;

reading index information which has been recorded with information to be targeted in a newly inserted recording medium, said index information including side information indicating a side of said recording medium on which said information to be targeted has been recorded;

generating position information associated with said index information and indicating the position of an accommodating section in which said newly inserted recording medium is accommodated in said accommodating means;

storing the index information read by said reading means, including said side information, and said position information generated by said generating means;

inputting desired index information; and comparing said desired index and side information with the index information stored by said storing means, and on the basis of a result of this comparison and the associated position information stored in said storing means, selecting the recording medium and side thereof which contains the targeted information.

21. A method of handling recording media comprising the steps of:

accommodating a plurality of recording media in an accommodating means having a plurality of accommodating sections;

reading index information recorded in an newly inserted recording medium, said index information including side information indicative of the side of said recording medium on which information corresponding to said index information is also recorded;

generating position information indicating an accommodating section in which said newly inserted recording medium is accommodated in said accommodating means;

storing the index information including associated side read by said reading means in association with the position information generated by said generating means;

inputting desired index information; and comparing said desired index information with the index information stored in said storing means, and on the basis of a result of this comparison and the associated position and side information stored in said storing means, selecting the recording medium and the side thereof which contains the targeted information.

* * * * *

UNITED STATES PATENT AND TRADEMARK OFFICE
CERTIFICATE OF CORRECTION

PATENT NO. : 6,188,651 B1
DATED : February 13, 2001
INVENTOR(S) : Kazuo Otani

It is certified that error appears in the above-identified patent and that said Letters Patent is hereby corrected as shown below:

Title page,
Item [54], in the Title, "AUTO" should read -- AUTO --; and
Item [63], Related U.S. Application Data, "Continuation-in-part" should read
-- Continuation --.

Column 1,
Line 2, "AUTO" should read -- AUTO --; and
Line 5, "continuation-in-part" should read -- continuation --.

Column 6,
Line 63, "An information retrieval system" should read -- A recording medium handling apparatus --.

Column 7,
Line 4, "An information retrieval system" should read -- A recording medium handling apparatus --;
Line 7, "An information retrieval system" should read -- A recording medium handling apparatus --;
Line 10, "An information retrieval system" should read -- A recording medium handling apparatus --;
Line 45, "information," should read -- information --.

Column 8,
Line 11, "is" should read -- are --; and
Line 26, "steps" should read -- step --.

Column 9,
Line 67, "record;" should read -- recorded; --.

UNITED STATES PATENT AND TRADEMARK OFFICE
CERTIFICATE OF CORRECTION

PATENT NO. : 6,188,651 B1
DATED : February 13, 2001
INVENTOR(S) : Kazuo Otani

It is certified that error appears in the above-identified patent and that said Letters Patent is hereby corrected as shown below:

<u>Column 10,</u>
Line 9, "be" should read -- to be --; and
Line 65, "an" should read -- a --.

Signed and Sealed this

Sixteenth Day of April, 2002

Attest:

JAMES E. ROGAN
*Attesting Officer*  *Director of the United States Patent and Trademark Office*